Oct. 15, 1929.                J. SCHÖN                1,731,871
                         GRAIN HUSKING MACHINE
                          Filed Oct. 25, 1928

Inventor:
Jindrich Schön.

Patented Oct. 15, 1929

1,731,871

UNITED STATES PATENT OFFICE

JINDŘICH SCHÖN, OF SENICE NA HANE, CZECHOSLOVAKIA

GRAIN-HUSKING MACHINE

Application filed October 25, 1928. Serial No. 315,057.

The subject matter of the present invention is a drum grain-husking machine the husking drums of which are so arranged that the grain that is to be treated is passed through lateral ducts from the hopper into the hollow space of the inner rotatable drum and thence into the gap between the casing of the inner drum and that of the outer drum, the inner drum working at the same time as a ventilator by sucking in the air and expelling it through the openings in the casing into the husking space.

Figure 1:
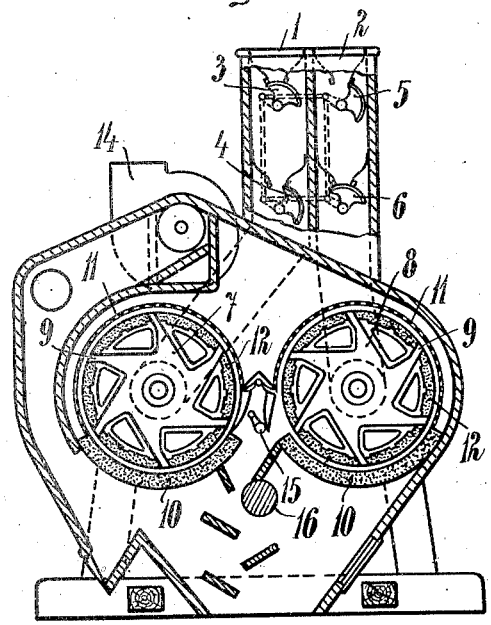
Figure 2:
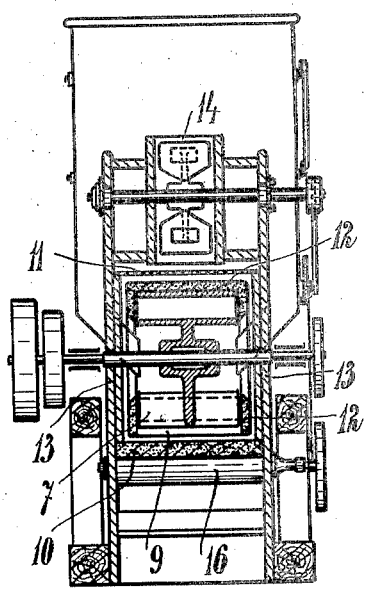

The invention is illustrated by way of example by the accompanying drawings of which:

Fig. 1 shows a longitudinal section, and Fig. 2 a cross-section through the machine.

The machine shown in the drawings operates, as hereinafter described, with one drum husking and the other running light.

*Period I.*—The grain is fed through the hopper 1 in which are located one above the other traps 3 and 4 intended for measuring off the grain. The grain falls from the hopper through the lateral ducts into the hollow drum 7 having a husking attachment on the periphery. From this drum it passes through the peripheral slots 9 of the casing into the space between the rotatable drum and the outer drum surrounding it, the casing of which consists partly of the husking attachment 10 and partly of the perforated plate 11 which can be brought as near as desired to the inner drum. The grain is husked in the gap between the drums.

During the husking operation the rotatable drum sucks the air in through the opening 13 and expels it between the grain through the openings 9; the air cools the grain and drives the dust and the husks out of it through the perforated plate into the outer space around the casing 11 from which the ventilator 14 sucks it up and drives it into the dust box. After the husking, the grain is let out by the trap 15 on to the supply roller 16 which lets it out uniformly. The current of air which is led over the grain and is sucked up by the ventilator 14 carries with it the last trace of dust and husks.

*Period II.*—The process of working already described is carried out in the second part of the machine the parts of which are the hopper 2, with the traps 5 and 6, the inner drum 8, etc. The traps 3, 4, 5, 6 and 15 are periodically moved by a mechanical device.

By constructing the drums in accordance with the invention the result is obtained that the grain is husked longitudinally and the tips are not broken off.

Variations may be made without departing from the scope of the present invention. For example, instead of the rotatable roller-shaped drum, the drum may be in the form of a truncated cone. The apparatus may have one or more drums.

I claim:

A grain husking machine comprising an outer drum having on its inner side a husking surface, an inner rotatable hollow drum with longitudinal slots in its casing and adapted on rotating to suck in air, said slots being adapted to allow the passage therethrough, into the husking space between said outer drum and said inner drum, of the air sucked in by said inner drum and the grain under treatment.

JINDŘICH SCHÖN.